(12) United States Patent
Fries et al.

(10) Patent No.: US 8,031,780 B2
(45) Date of Patent: Oct. 4, 2011

(54) SMOOTH SCANNING PRESENTER

(75) Inventors: Robert M. Fries, Redmond, WA (US);
Eric J. Wolz, Bothel, WA (US)

(73) Assignee: Microsoft Corporation, Redmond, WA (US)

(*) Notice: Subject to any disclaimer, the term of this patent is extended or adjusted under 35 U.S.C. 154(b) by 1372 days.

(21) Appl. No.: 11/469,238

(22) Filed: Aug. 31, 2006

(65) Prior Publication Data
US 2006/0291559 A1    Dec. 28, 2006

Related U.S. Application Data

(62) Division of application No. 10/155,499, filed on May 23, 2002, now Pat. No. 7,106,798.

(51) Int. Cl.
*H04N 7/18*    (2006.01)

(52) U.S. Cl. ............................. 375/240.25; 375/240.13
(58) Field of Classification Search . 375/240.01–240.29
See application file for complete search history.

(56) References Cited

U.S. PATENT DOCUMENTS

| 6,034,731 | A | 3/2000 | Hurst, Jr. |
| 6,600,835 | B1 | 7/2003 | Ishikawa |

*Primary Examiner* — Andy Rao
(74) *Attorney, Agent, or Firm* — Lee & Hayes, PLLC

(57) ABSTRACT

Described herein is a technology for the presentation of digital video. One implementation, described herein, smoothly presents variable-speed scanning of a compressed digital video stream—for example, a MPEG video stream. One implementation, described herein, smooth scanning (e.g., fast-forward and fast-rewind) video is produced by selectively displaying certain types of frames of a Group-of-Pictures (GOP). The scope of the present invention is pointed out in the appending claims.

18 Claims, 8 Drawing Sheets

Fig. 1
(background)

Fig. 2
(background)

SMOOTH SCANNING PRESENTER

RELATED APPLICATION

This patent application is a divisional of, and claims priority from, U.S. patent application Ser. No. 10/155,499 filed May 23, 2002, the disclosure of which is incorporated by reference herein.

TECHNICAL FIELD

This invention is generally related to technology for the presentation of digital video.

BACKGROUND

With the increasing popularity of DVDs and the advent of video-on-demand (VOD) systems, the videos (e.g., moving images) being viewed in homes and businesses are digital. The predominant video compression and transmission formats are from a family called MPEG (Moving Picture Experts Group). It is the name of family of standards used for coding audio-visual information (e.g., movies, video, music, and such) in a digital compressed format.

MPEG

Generally, a MPEG video stream is composed of three types of frames:

intra frames (I-frames),
predictive frames (P-frames); and
bi-directionally predictive frames (B-frames).

An MPEG video stream is typically defined by segments called Groups of Pictures (GOP). Typically, a GOP consists of a set of pictures of ½ second duration when displayed at their intended speed.

Figure 1:
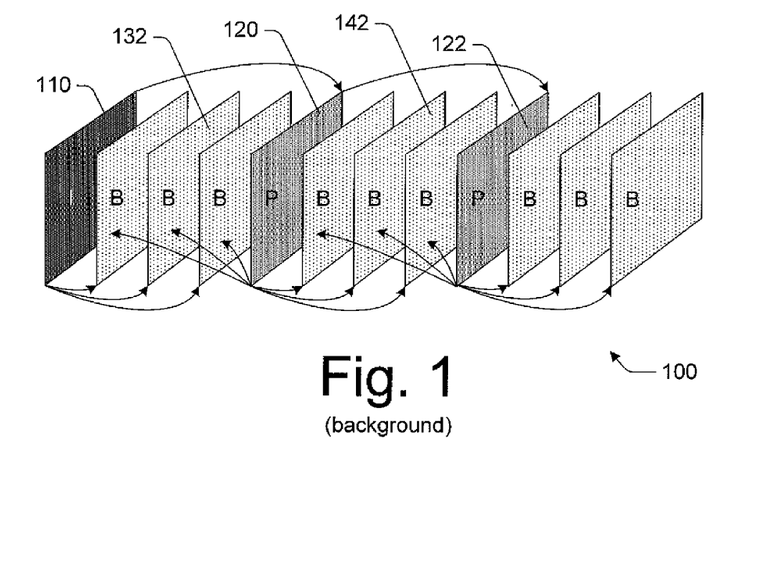
FIG. 1 illustrates an arrangement of frames of a typical Group-of-Pictures (GOP).

FIG. 1 illustrates a typical MPEG GOP 100. This example includes an I-frame; two P-frames; and nine B-frames. Typically, each GOP includes consecutive frames beginning or ending with an I-frame (such as frame 110).

Decoding typically begins at the chronographic start of any GOP, essentially independent of any preceding GOPs. That is I-frame 110 in the GOP 100 of FIG. 1. There is no specific limit to the number of pictures which may be in a GOP, nor is there a requirement for an equal number of pictures in all GOPs in a video sequence.

I-frames and P-frames are called "anchor" frames (of "key" frames). An I-frame can be decoded independently of any other frames. It does not rely on data from any other frame to construct its image. A P-frame (such as frame 120) requires data from a previously decompressed anchor frame (e.g., I-frames or P-frames) to enable its decompression. While it is dependent, it is only dependent of an anchor frame that has already been decoded.

A B-frame (such as frame 132) requires data from both preceding and succeeding anchor frames (e.g., I-frames or P-frames) to decode its image. It is bi-directionally dependent.

In FIG. 1, the ends of the arrows indicate the frame(s) from which the arrow-pointed frame is dependent. For example, B-frame 142 is dependent upon P-frame 120 and P-frame 122.

Conventional "Trick Play" Technology

Scanning is when a user views a video (either forward or backwards) at a rate of speed other than the intended or specified. The most common example of scanning is fast-forward-play (FF-play) and rewind-play (RW-play). Scanning is also called "trick play" mode.

The conventional technique to scan digital video, specifically MPEG, is to drop all of the dependent frames as the video is scanned (forward or backwards).

With conventional scanning of digital video (namely, MPEG), only I-frames are displayed. Thus, the B-frames and P-frames are skipped while scanning. This is a fairly straightforward task. Since the I-frames do not depend upon any other frames, they may be simply plucked from the Group-of-Pictures (GOP) and displayed without any additional frame inter-dependency processing.

Figure 2:
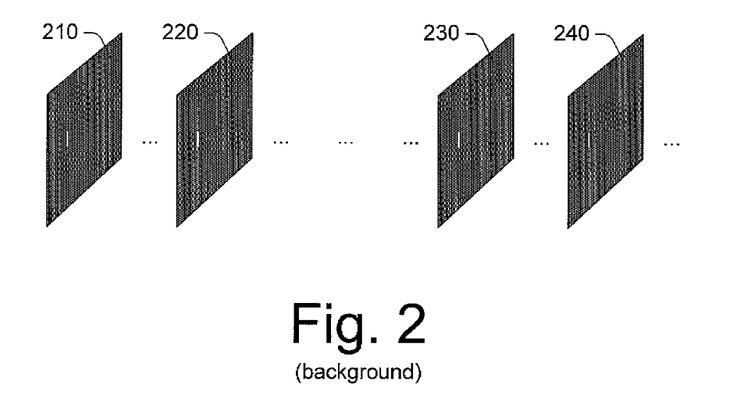
FIG. 2 illustrates an arrangement of frames produced by conventional scanning technology.

FIG. 2 illustrates the presentation of only the I-frames of GOPs. In this example, I-frames 210, 220, 230, and 240 are shown. No B-frames or P-frames are shown.

However, this conventional solution produces a poor moving-picture quality because of several factors, such as uneven I-frames spacing. The moving images appear jerky, jumpy, shuddering, and erratic.

Conventional MPEG Scanning Solution

Using only this conventional approach, the minimum scan-rate is quite fast. It may be 10-15 times the normal play rate.

For example, if there are 12 frames in a GOP (like that of FIG. 1), the slowest scan-rate that can be achieved via these traditional techniques is 12-15 times the normal speed. When all of the dependent frames (B-frames and P-frames) are dropped, that leaves about one I-frames per 12-frame GOP.

However, there are other conventional techniques that approximate slower scan-rates—that is, slower than 10-15 times the normal speed. This is achieved by holding I-frames longer. However, doing this only accentuates the jerkiness of the scan. The scan appears even more jerky, jumpy, shuddering, and erratic.

Accordingly, it is a challenge to present a scan of digital video that does not appear jerky, jumpy, shuddering, or erratic.

SUMMARY

Described herein is a technology for the presentation of digital video.

One implementation, described herein, smoothly presents variable-speed scanning of a compressed digital video stream—for example, a Motion Picture Experts Group (MPEG) video stream. One implementation, described herein, smooth scanning (e.g., fast-forward and fast-rewind) video is produced by selectively displaying certain types of frames of a Group-of-Pictures (GOP).

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, thereby better explain the present invention. Furthermore, for ease of understanding, certain method steps are delineated as separate steps; however, these separately delineated steps should not be construed as necessarily order dependent in their performance.

The following description sets forth one or more exemplary implementations of a Smooth Scanning Presenter that incorporate elements recited in the appended claims. These implementations are described with specificity in order to meet statutory written description, enablement, and best-mode requirements. However, the description itself is not intended to limit the scope of this patent.

The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of a Smooth Scanning Presenter may be referred to as an "exemplary presenter."

Introduction

Figure 4:
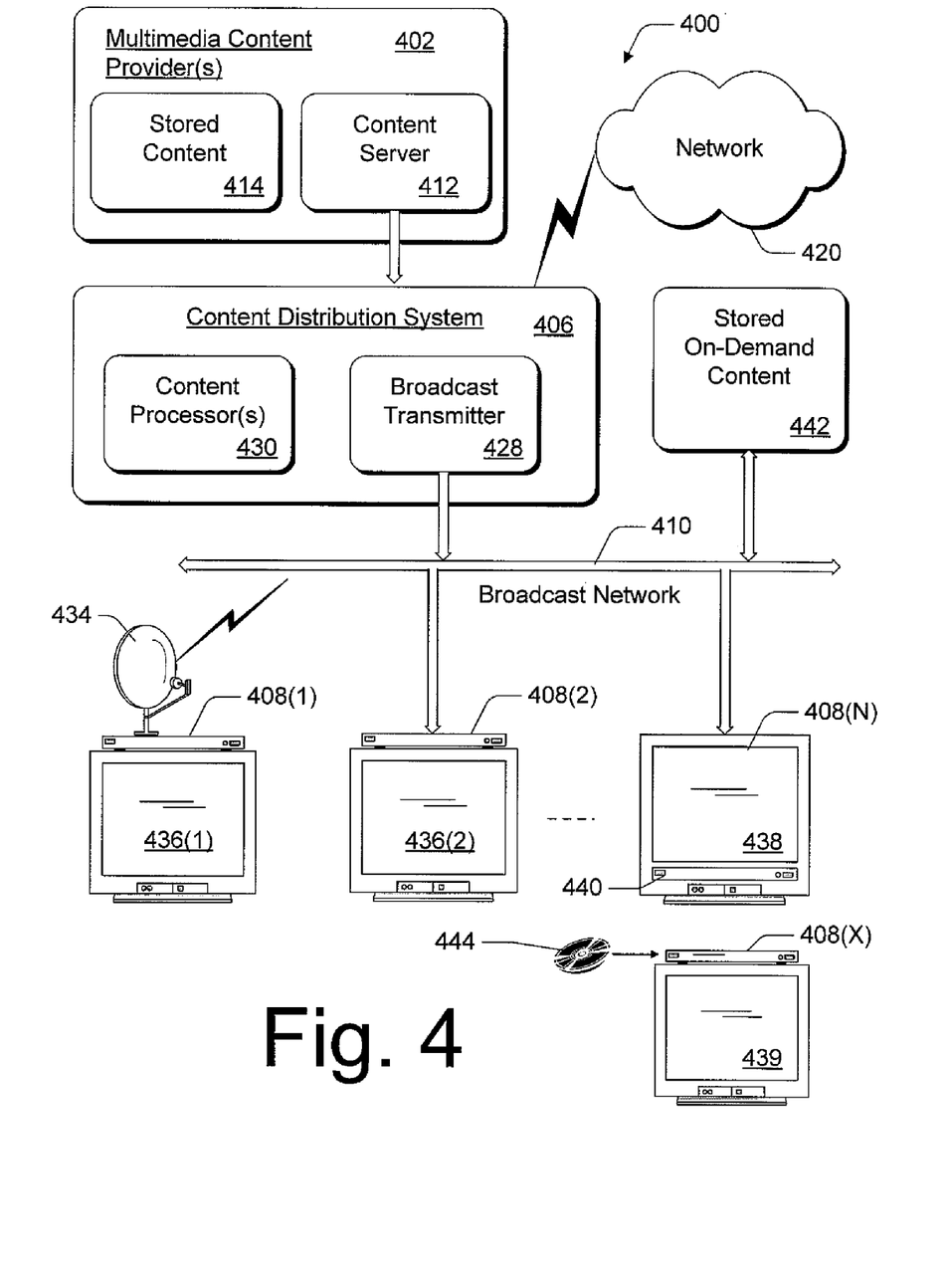
FIG. 4 illustrates exemplary environment in which an implementation described herein may be employed.
Figure 5:
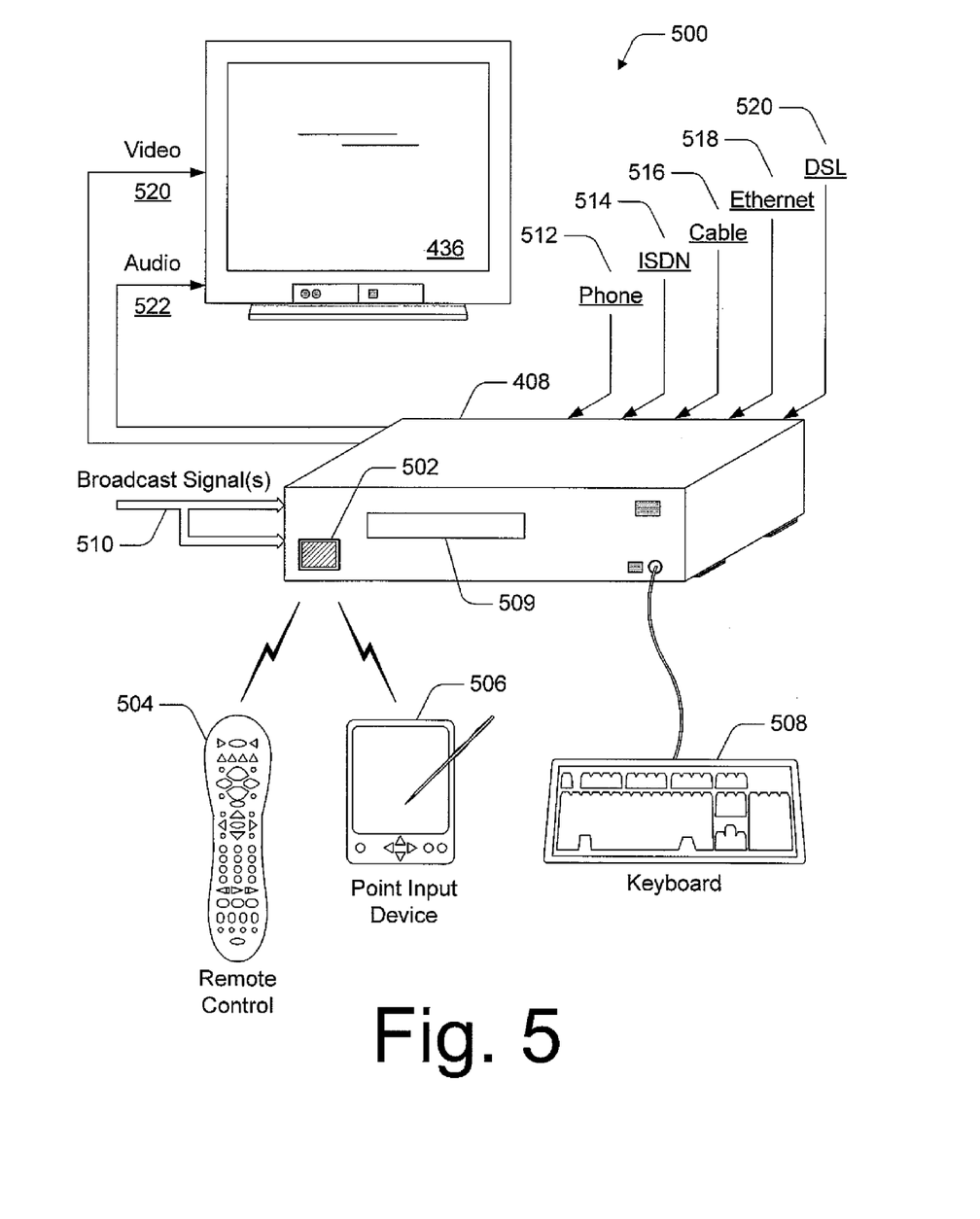
FIG. 5 illustrates of an example presentation device, a television, and various input devices that interact with the presentation device.
Figure 6:
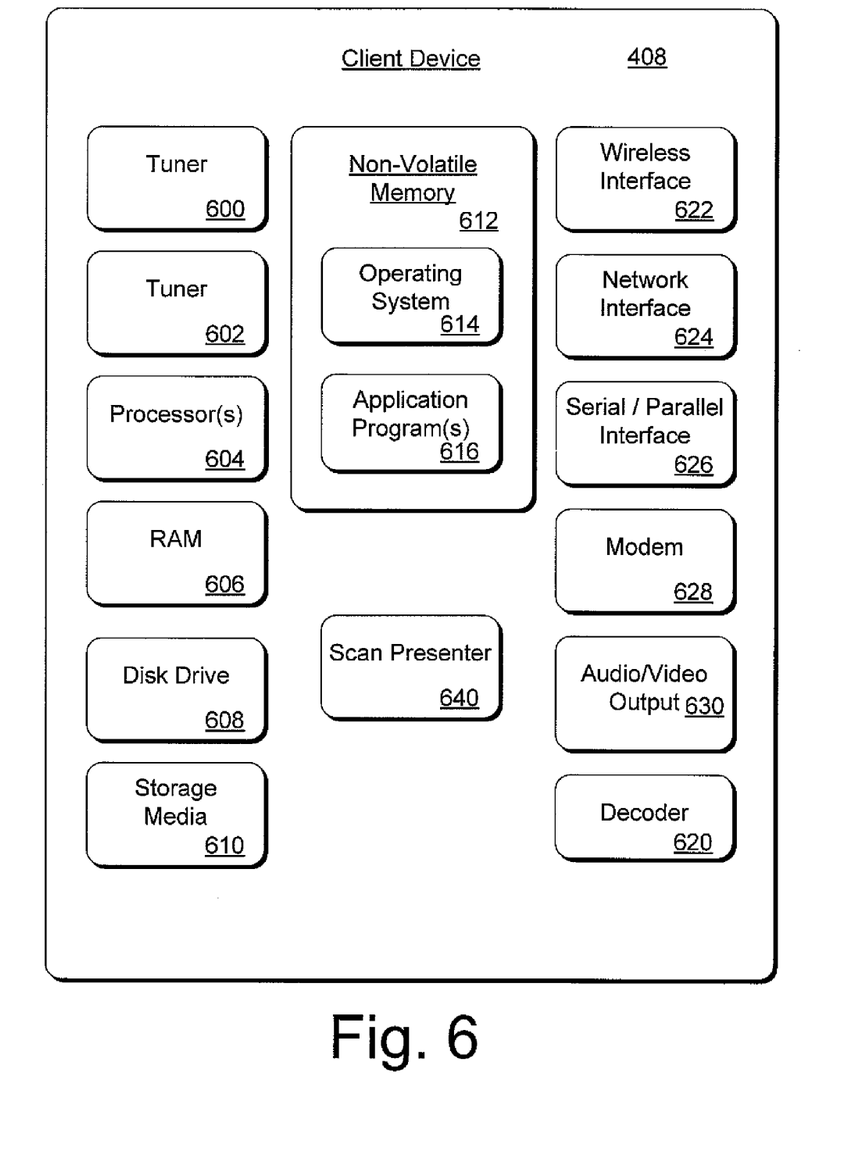
FIG. 6 is a block diagram that illustrates components of the example presentation device(s) shown in FIGS. 4 and 5.

The exemplary presenter may be implemented (partially or wholly) on systems, devices, and/or communications networks like that show in FIGS. 4 through 6.

One implementation, described herein, smoothly presents variable-speed scanning of a compressed digital video stream—for example, a Motion Picture Experts Group (MPEG) video stream. One implementation, described herein, smooth scanning (e.g., fast-forward and fast-rewind) video is produced by selectively displaying certain types of frames of a Group-of-Pictures (GOP).

Scanning is when a user views a video (either forward or backwards) at a rate of speed other than the intended or specified rate. The most common example of scanning is fast-forward-play (FF-play) and rewind-play (RW-play). Scanning is also called "trick play" mode.

The conventional technique to scan digital video, specifically MPEG, is to drop the dependent frames as the video is played (forward or backwards). That way, only the independent (e.g., I-frames) are displayed.

However, this conventional solution produces a poor moving-picture quality. The moving images appear jerky, jumpy, shuddering, and erratic.

Furthermore, the conventional approaches to producing variable-rate scans which are slower than one frame per Group-of-Pictures (GOP) are achieved by holding the independent frames (e.g., I-frames) longer. However, that only accentuates the jerkiness of the scan. The scan appears even more jerky, jumpy, shuddering, and erratic.

None of the conventional approaches to a scanning presentation of digital video display the moving images in a smooth manner. Furthermore, none of the conventional approaches to scanning presentation of digital video display any of the dependent frames (e.g., B- or P-frames). Moreover, none of the conventional approaches progressively drop dependent frames from the scanning presentation of a GOP as the scan-rate increases.

Herein, references to "dropping" a frame of a GOP refers to its selection for non-presentation and/or the actual non-presentation of the frame. By implication, the frames that are not "dropped" are selected for presentation and/or are actually presented.

Herein, references to presentation of a frame or GOP includes (by way of example and not limitation) actual visual display of such. If not limited by context, then it may also include (by way of example and not limitation) transmission to such frame or GOP to a device (such as a television) for actual visual display.

Herein, MPEG is the example of the digital video format discussed. However, the techniques of the exemplary presenter may be applied to other multi-media data compression schemes having GOP structures.

For clarity, the example of fast-forward-play operation is referenced herein. Those of ordinary skill in the art will understand that the techniques of the exemplary presenter apply equally to fast-backward-play operations. Thus, scanning generically refers to either forward or reverse play at a rate faster than that specified or defined for the digital video.

Frame Dependencies

Most of the frames of a GOP depend upon other frames and many have frames that depend upon them. In FIG. 1, the ends of the arrows indicate the frame(s) from which the arrow-pointed frame is dependent.

As shown in FIG. 1, no other type of frame relies on the data of B-frames. Therefore, the absence of a B-frame from a GOP does not affect the regeneration (or decoding) of any other frame of the GOP.

However, this is not true for P-frames. As can be seen in FIG. 1, other frames rely on P-frames—specifically, B-frames and/or other P-frames. Therefore, P-frames cannot be indiscriminately dropped from a GOP.

However, if all of the B-frames of a GOP are absent, then one of the P-frames (such as frame 122) has no frame that relies upon it. Therefore, the regeneration (or decoding) of other frames are not affected by its absence.

If all of the B-frames are dropped, P-frames may be dropped in reverse chronological order (e.g., frame 122 first and then frame 120). In this manner, no frame will be dependent upon the one being dropped.

A frame's current dependency status may be described in the following manner:
  independent
  "parent-way" dependency
  "child-way" dependency A "parent-way" dependent frame is one from which other frames depend. A "child-way" dependent frame is one that depends upon others.

The frames of a standard fully formed MPEG GOP (like the one illustrated in FIG. 1) have these dependencies:
  I-frames are parent-way dependent, but child-way independent
  P-frames are both parent-way dependent and child-way dependent
  B-frames are child-way dependent However, if all of the B-frames are absent from the GOP, then a P-frame becomes solely child-way dependent.

Exemplary Presenter

The exemplary presenter produces a smooth presentation of a scanning (e.g., fast-forward) video operation.

Figure 3A:
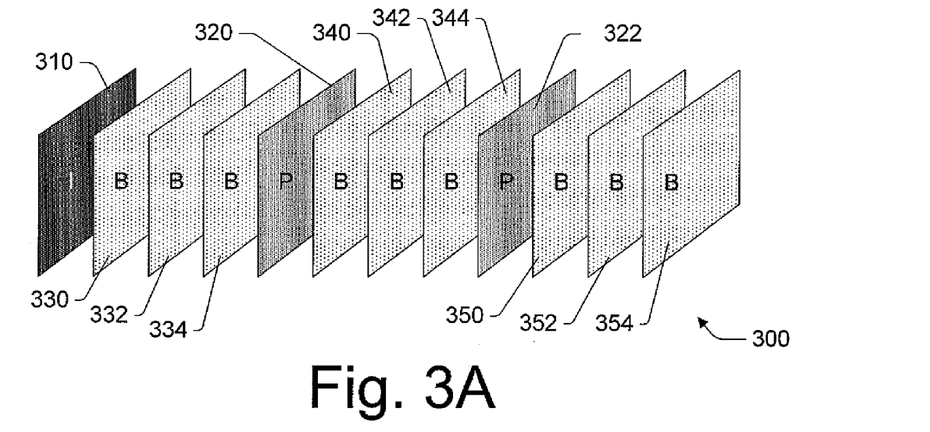
FIGS. 3A-3H illustrates arrangements of frames of GOPs produced by an implementation described herein.

FIG. 3A is similar to FIG. 1 and also illustrates a typical MPEG GOP 300. FIG. 3A is provided for comparative reference to FIGS. 3B-3H. As part of such purpose, all of the frames of the example GOP 300 are illustrated in FIG. 3A.

The example GOP 300 includes an I-frame (310); two P-frames (320, 322); and nine B-frames (330, 332, 334, 340, 342, 344, 350, 352, 354). Again, this is just an example. The composition of actual GOPs may vary.

FIGS. 3B-3H illustrate the progressive modification of GOP 300 as the variable scan-rate increases. The frames with dashed outlines have been "dropped". They are selected for non-presentation and/or are not presented.

The GOPs illustrated in FIGS. 3B-3G represent examples of "scan" GOPs. This is simply a label to distinguish it from fully formed GOPs played at normal rates.

Although the physical spacing between frames of FIGS. 3B-3H is not changed, the temporal spacing has. The dashed boxes remain to better illustrate their "dropped" status, but since they are not presented, they consume no time during the presentation of the new GOP. So, the viewer never sees the dashed-line frames when a scanning display of the GOP is viewed.

Figure 3B:
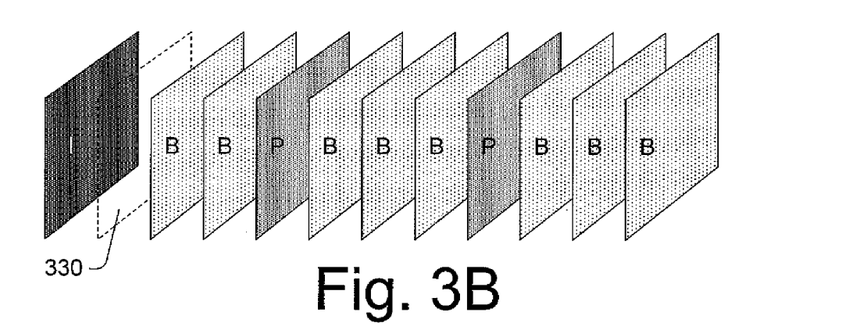

FIG. 3B shows a scan at a rate slightly faster than normal. The GOP plays at approximately 12/11 speed. B-frame 330 is dropped. It will not be displayed at this scan-rate. Dropping this B-frame does not affect any other frames. That is because this frame is not parent-way dependent. Instead, it is only child-way dependent. Of course, other B-frames may have been dropped instead of frame 330.

Although FIG. 3B shows the first B-frame of the GOP being dropped, the exemplary presenter may instead drop the last B-frame of the GOP. Doing so, may be faster than dropping the first B-frame.

Figure 3C:
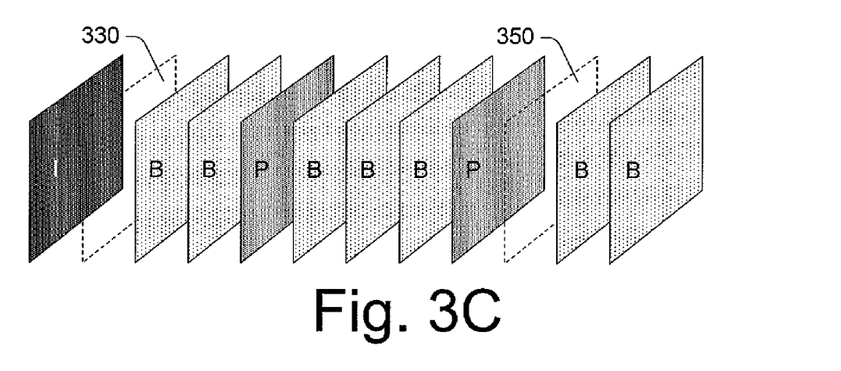

FIG. 3C shows an increased scan-rate. The GOP plays at approximately 12/10 speed. B-frames 330 and 350 are dropped. They will not be displayed at this scan-rate. Dropping these B-frames does not affect any other frames. That is because these frames are not parent-way dependent. Instead, they are only child-way dependent. Of course, other B-frames may be dropped instead.

Figure 3D:
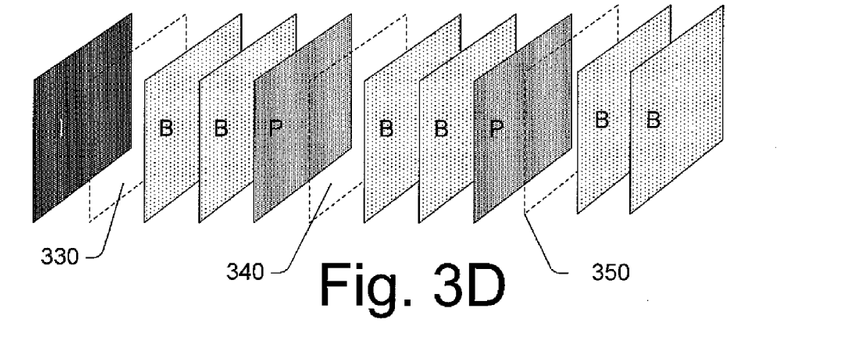

FIG. 3D shows a further increase in the scan-rate. The GOP plays at approximately 12/9 speed. B-frames 330, 340 and 350 are dropped. They will not be displayed at this scan-rate. Dropping these B-frames does not affect any other frames. That is because these frames are not parent-way dependent. Instead, they are only child-way dependent. Of course, other B-frames may be dropped instead.

Figure 3E:
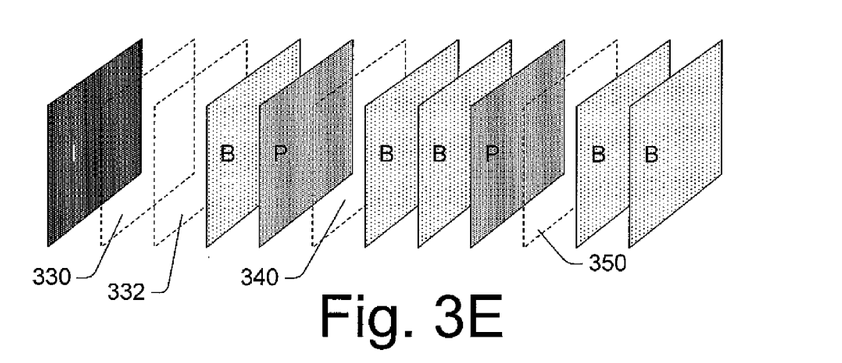

FIG. 3E shows an even greater increase in the scan-rate. The GOP plays at approximately 12/8 speed. B-frames 330, 332, 340 and 350 are dropped. They will not be displayed at this scan-rate. Dropping these B-frames does not affect any other frames. That is because these frames are not parent-way dependent. Instead, they are only child-way dependent. Of course, other B-frames may be dropped instead.

FIGS. 3B-3E illustrate single frame increments in the scan-rate increase. Those who are skilled in the art can project the dropping of the remaining B-frames as the scan-rate continues to increase.

Figure 3F:
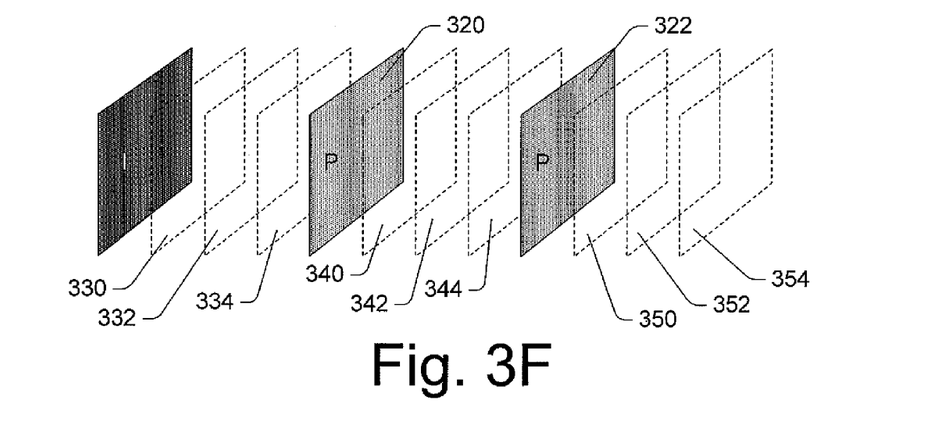

FIG. 3F shows an increased scan-rate. The GOP plays at approximately 12/3 speed. All of the B-frames (330, 332, 334, 340, 342, 344, 350, 352 and 354) are dropped. They will not be displayed at this scan-rate. Dropping all of the B-frames does not affect any other frames. That is because the B-frames are not parent-way dependent. Instead, they are only child-way dependent.

Figure 3G:
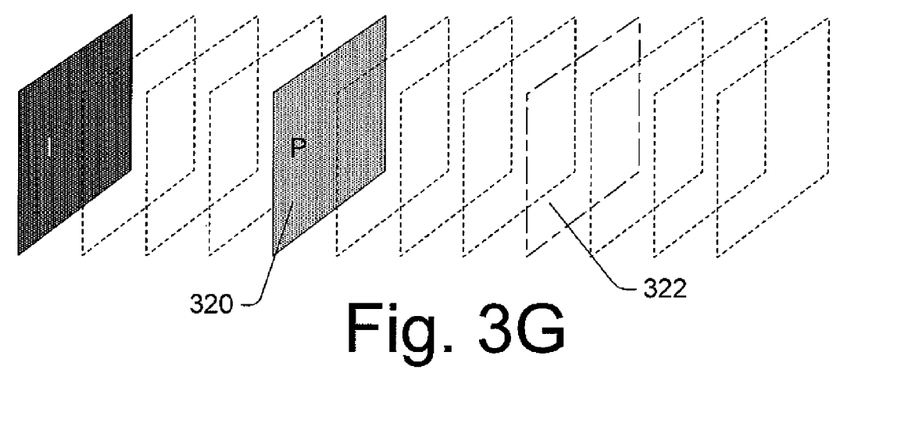

In FIG. 3G, the scan-rate has increased more still. The GOP plays at approximately 12/2 speed. Like that of FIG. 3F, all of the B-frames are dropped, but now a P-frame 322 is also dropped. Neither this P-frame nor the B-frames will be displayed at this scan-rate.

Dropping this P-frame 322 does not affect any other frames. Since the B-frames are gone, none of them depend upon the P-frames (320 and 322). P-frame 320 cannot be removed because P-frame 322 still relies on it (see FIG. 1 for the dependency arrows). However, P-frame 322 is no longer parent-way dependent. With the removal of the B-frames, this P-frame 322 is only child-way dependent.

Figure 3H:
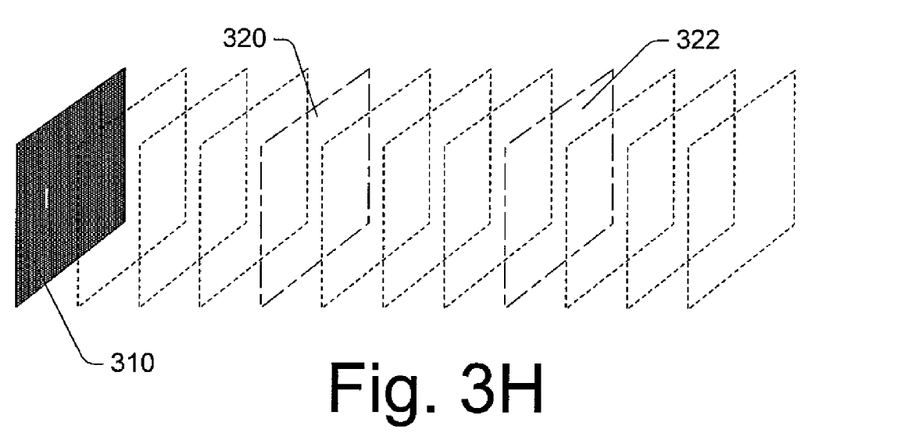

FIG. 3H shows the maximum scan-rate that may be achieved while still retaining at least one frame from a GOP. P-frame 320 is dropped, which leave just one frame of the GOP remaining. Specifically, only the independent I-frame 310 remains.

None of the P-frames and none the B-frames will be displayed at this scan-rate. Dropping this last remaining P-frame 320 does not affect any other frames. Since the B-frames are gone, none of them depend upon this P-frame 320. Since P-frame 322 has been dropped, it no longer relies on this P-frame 320. Therefore, P-frame 320 is no longer parent-way dependent. After the removal of the B-frames and P-frame 322, this P-frame 320 is only child-way dependent.

If the scanning is chronologically forwards (e.g., fast-forward-play), a presentation device may drop frames "on-the-fly." That means that the device may skip "dropped" frames while accessing the frames of GOP for presentation. Thus, the device need never process a dropped frame.

Herein, processing a frame may include, for example, decoding and/or decompressing the frame.

If the scanning is chronologically backwards (e.g., rewind-play), a presentation device may need to access an entire GOP before dropping of frames. If so, a buffer can hold GOP while it is being processed. Even with this buffering approach to rewind-play, the dropped frames need not be processed.

Distributed "Dropping"

To further enhance the smoothness of the scanning presentation, the frames selected for dropping are distributively selected across the GOP as the scan-rate increases. Notice an example of such distributive selection by examining FIGS. 3B-3E.

In this illustrated example, successively dropped B-frames are non-adjacent. As shown in FIG. 3C, frame 350 was dropped after frame 330 was dropped. As shown in FIG. 3D, frame 340 was dropped after frames 330 and 340 were dropped.

Other Implementation Details of the Exemplary Presenter

There are various ways of describing how the exemplary presenter produces a smooth presentation of a scanning (e.g., fast-forward) video operation. Some of those include the following:

Editing GOPs

The exemplary presenter selectively edits certain types of MPEG frames from the MPEG video sequence (e.g., GOP) on-the-fly. First, B-frames are removed, then P-frames are removed and finally I-frames are removed. It displays all of the non-removed frames. How many frames are edited is in response to an indicator that specifies the desired scan-rate. As is illustrated in FIGS. 3A-3I, the faster the rate, the more frames that are dropped.

Presentation and Non-Presentation Frames

The exemplary presenter selects specific frames of a GOP for presentation and it selects frames of the GOP for non-presentation. If one assumes that the frames are part of one group or the other, then the selection of frames for one group inherently selects frames for the other.

The non-presentation frames are selected in the following order:

B-frames;

P-frames, if all of B-frames are selected.

The exemplary presenter, then, presents the selected presentation frames of the GOP.

The relative number of frames in each group (for presentation and for non-presentation) is relative to an indicator that specifies the desired scan-rate. As is illustrated in FIGS. 3A-3I, the faster the rate, the more frames are selected for non-presentation.

Dropping Frames

The exemplary presenter "drops" specific frames of a GOP. Only the non-dropped frames are destined from presentation. The dropped frames are not "parent-way" dependent. The dropped frames may "child-way" dependent, but they are not parent-way dependent.

As such, B-frames are the first frames dropped. While a B-frame depends upon other frames (i.e., "child-way" dependent), no other frame depends upon it (i.e., "parent-way" dependent).

As long as there are B-frames, then P-frames (320 and 322) are both child-way and parent-way dependent. The P-frames depend upon an I-frame or another P-frame (i.e., "child-way" dependent). Furthermore, B-frames depend upon them (i.e., "parent-way" dependent).

However, if all of the B-frames are dropped (as shown in FIG. 3F), then at least one P-frame (e.g., frame 322) has no frame that depends upon it. In this situation, it is no longer parent-way dependent. Therefore, it is next to be dropped (as is shown in FIG. 3G).

The exemplary presenter presents the non-dropped frames of the GOP.

The relative number of dropped frames to non-dropped frames is relative to an indicator that specifies the desired scan-rate. As is illustrated in FIGS. 3A-3I, the faster the rate, the more frames are selected for non-presentation.

Temporally Condensed Presentation

The exemplary presenter presents a selection of frames of a GOP. In so doing, it temporally condenses the presentation of the sequence of frames of the GOP. In other words, it increases the scan-rate of the video so that it is faster than its normal rate. In still other words, it speeds up the video (e.g., fast-forward-play or fast-rewind-play).

The exemplary presenter presents a temporally condensed GOP that is less than all of the frames of the original and more then just one (e.g., I-frame). FIGS. 3B-3G illustrate example of the temporally condensed GOP that the exemplary presenter may present.

Variable Scan-Rate

In addition to being smoother, the exemplary presenter provides a mechanism for slowly increasing the scan-rate. If there are 12 frames in a GOP (like that of FIG. 1), the slowest scan-rate that can be achieved via traditional techniques is 12-15 times the normal speed. If all dependent frames (B-frames and P-frames) are dropped, that leaves about one I-frame per 12-frame GOP.

Conventionally, rates slower than 12-15 times the normal speed are achieved by holding I-frames longer. However, that only accentuates the jerkiness of the scan. The scan appears even more jerky, jumpy, shuddering, and erratic.

To determine how many frames to drop, the exemplary presenter receives a scan-rate indication. The number of dropped frames is relative to the scan-rate indication. That indication may be manually or automatically generated. If manually generated, a viewer may indicate her desired scan-rate using a hardware or software user-interface (UI). Examples of a suitable hardware interface include a job shuttle, a knob, a dial, buttons, etc. on a remote or on a presentation device.

This automatically or manually generated scan-rate indicator may be represented by a digital or analog signal. Such a signal may be called a variable scan-rate indicator (i.e., indication).

Exemplary Environment

FIG. 4 illustrates an exemplary environment 400 in which the techniques, systems, and other aspects described herein may be implemented (partially or wholly). Exemplary environment 400 is a television entertainment system that facilitates distribution of multi-media. A typical digital video broadcast (DVB) network is an example of such an environment.

The environment 400 includes one or more multimedia content providers 402, a content distribution system 406, and one or more presentation devices 408(1), 408(2), . . . , 408(N) coupled to the content distribution system 406 via a broadcast network 410.

Multimedia content provider 402 includes a content server 412 and stored content 414, such as movies, television programs, commercials, music, and similar audio and/or video content. Content server 412 controls distribution of the stored content 414 from content provider 402 to the content distribution system 406. Additionally, content server 402 controls distribution of live content (e.g., content that was not previously stored, such as live feeds) and/or content stored at other locations to the content distribution system 406.

Content distribution system 406 may be coupled to a network 420, such as an intranet or the Internet. The content distribution system 406 includes a broadcast transmitter 428, and one or more content processors 430. Broadcast transmitter 428 broadcasts signals, such as cable television signals, across broadcast network 410.

Content distribution system 406 is representative of a headend service that provides multimedia content to multiple subscribers.

Broadcast network 410 can include a cable television network, RF, microwave, satellite, and/or data network, such as the Internet, and may also include wired or wireless media using any broadcast format or broadcast protocol. Additionally, broadcast network 410 can be any type of network, using any type of network topology and any network communication protocol, and can be represented or otherwise implemented as a combination of two or more networks.

Content processor 430 processes the content received from content provider 402 prior to transmitting the content across broadcast network 408. A particular content processor 430 may encode, or otherwise process, the received content into a format that is understood by the multiple presentation devices 408(1), 408(2), . . . , 408(N) coupled to broadcast network 410.

Presentation devices 408 can be implemented in a number of ways. For example, a presentation device 408(1) receives broadcast content from a satellite-based transmitter via a satellite dish 434. Presentation device 408(1) is also referred to as a set-top box or a satellite receiving device. Presentation device 408(1) is coupled to a television 436(1) for presenting the content received by the presentation device (e.g., audio data and video data), as well as a graphical user interface. A particular presentation device 408 can be coupled to any number of televisions 436 and/or similar devices that can be implemented to display or otherwise render content. Similarly, any number of presentation devices 408 can be coupled to a single television 436.

Presentation device 408(2) is also coupled to receive broadcast content from broadcast network 410 and provide the received content to associated television 436(2). Presentation device 408(N) is an example of a combination television 438 and integrated set-top box 440. In this example, the various components and functionality of the set-top box are incorporated into the television, rather than using two separate devices. The set-top box incorporated into the television may receive broadcast signals via a satellite dish (similar to satellite dish 434) and/or via broadcast network 410. In alternate implementations, presentation devices 406 may receive broadcast signals via the Internet or any other broadcast medium.

The exemplary environment 400 also includes stored on-demand content 442, such as Video On-Demand (VOD) movie content. The stored on-demand content can be viewed with a presentation device 408 through an onscreen movie guide, for example, and a viewer can enter instructions to stream a particular movie, or other stored content, down to a corresponding presentation device 408.

Thus far, this exemplary environment 400 has been described in terms of a digital video broadcast (DVB) environment. Indeed, that is an exemplary environment. However, the exemplary presenter may be implemented without the whole of the DVB environment itself. Instead, it may be implemented by a standalone presentation device, such as illustrated by device 408(X).

Standalone presentation device 408(X) accesses digital video from a storage medium 444, such as a DVD disk. It provides the content from the medium to an associated television 439. Examples of such a standalone presentation device include DVD player, a personal video recorder, etc.

Exemplary Presentation Device

FIG. 5 illustrates an exemplary implementation 500 of a presentation device 408 shown as a standalone unit that connects to a television 436. Presentation device 408 can be implemented in any number of embodiments, including as a set-top box, a satellite receiver, a TV recorder with a hard disk, a game console, an information appliance, a DVD player, personal video recorder, and so forth.

Presentation device 408 includes a wireless receiving port 502, such as an infrared (IR) or Bluetooth wireless port, for receiving wireless communications from a remote control device 504, a handheld input device 506, or any other wireless device, such as a wireless keyboard. Handheld input device 506 can be a personal digital assistant (PDA), handheld computer, wireless phone, or the like. Additionally, a wired keyboard 508 is coupled to communicate with the presentation device 408. In alternate embodiments, remote control device 504, handheld device 506, and/or keyboard 508 may use an RF communication link or other mode of transmission to communicate with presentation device 408.

Presentation device 408 may have a storage medium reader 509 for reading content storage media, such as DVD disks. A standalone or non-standalone presentation device 408 may include the storage medium reader 509.

Presentation device 408 may receive one or more broadcast signals 510 from one or more broadcast sources, such as from a satellite or from a broadcast network. Presentation device 408 includes hardware and/or software for receiving and decoding broadcast signal 510, such as an NTSC, PAL, SECAM or other TV system video signal.

Presentation device 408 also includes hardware and/or software for providing the user with a graphical user interface by which the user can, for example, access various network services, configure the presentation device 408, and perform other functions.

Presentation device 408 may be capable of communicating with other devices via one or more connections including a conventional telephone link 512, an ISDN link 514, a cable link 516, an Ethernet link 518, a DSL link 520, and the like. Presentation device 408 may use any one or more of the various communication links 512-520 at a particular instant to communicate with any number of other devices.

Presentation device 408 generates video signal(s) 520 and audio signal(s) 522, both of which are communicated to television 436. The video signals and audio signals can be communicated from presentation device 408 to television 436 via an RF (radio frequency) link, S-video link, composite video link, component video link, or other communication link.

Although not shown in FIG. 5, presentation device 408 may include one or more lights or other indicators identifying the current status of the device. Additionally, the presentation device may include one or more control buttons, switches, or other selectable controls for controlling operation of the device.

FIG. 6 illustrates selected components of presentation device 408 shown in FIGS. 4 and 5. Presentation device 408 includes a first tuner 600 and an optional second tuner 602. These tuners may be called the receiving unit. The tuners 600 and 602 are representative of one or more in-band tuners that tune to various frequencies or channels to receive television signals, as well as an out-of-band tuner that tunes to the broadcast channel over which other content may be broadcast to presentation device 408.

Presentation device 408 also includes one or more processors 304 and one or more memory components. Examples of possible memory components include a random access memory (RAM) 606, a disk drive 608, a mass storage component 610, and a non-volatile memory 612 (e.g., ROM, Flash, EPROM, EEPROM, etc.).

Alternative implementations of presentation device 408 can include a range of processing and memory capabilities, and may include more or fewer types of memory components than those illustrated in FIG. 6.

Processor(s) 604 process various instructions to control the operation of presentation device 408 and to communicate with other electronic and computing devices. The memory components (e.g., RAM 606, disk drive 608, storage media 610, and non-volatile memory 612) store various information and/or data such as multimedia content, electronic program data, web content data, configuration information for presentation device 408, and/or graphical user interface information. The device may cache data into any one of these many memory components.

An operating system 614 and one or more application programs 616 may be stored in non-volatile memory 612 and executed on processor 604 to provide a runtime environment. A runtime environment facilitates extensibility of presentation device 408 by allowing various interfaces to be defined that, in turn, allow application programs 616 to interact with presentation device 408.

The application programs 616 that may be implemented at presentation device 408 can include an electronic program guide (EPG), an email program to facilitate electronic mail, and so on.

Presentation device 408 can also include other components pertaining to a television entertainment system which are not illustrated in this example for simplicity purposes. For instance, presentation device 408 can include a user interface application and user interface lights, buttons, controls, etc. to facilitate viewer interaction with the device.

Presentation device 408 also includes a decoder 620 to decode a broadcast video signal, such as an NTSC, PAL, SECAM or other TV system video signal. Presentation device 408 further includes a wireless interface 622, a network interface 624, a serial and/or parallel interface 626, and a modem 628. Wireless interface 622 allows presentation device 408 to receive input commands and other information from a user-operated input device, such as from a remote control device or from another IR, Bluetooth, or similar RF input device.

Network interface 624 and serial and/or parallel interface 626 allows presentation device 408 to interact and communicate with other electronic and computing devices via various communication links. Although not shown, presentation device 408 may also include other types of data communication interfaces to communicate with other devices. Modem 628 facilitates presentation device 408 communication with other electronic and computing devices via a conventional telephone line.

Presentation device 408 also includes an audio/video output 630 that provide signals to a television or other device that processes and/or presents or otherwise renders the audio and video data. This output may be called the display.

Presentation device 408 also includes a scan presenter 640 that partially or wholly implements the exemplary presenter. It may be application program or a hardware component.

Although shown separately, some of the components of presentation device 408 may be implemented in an application specific integrated circuit (ASIC). Additionally, a system bus (not shown) typically connects the various components within presentation device 408.

A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Methodological Implementation of the Exemplary Presenter

Figure 7:
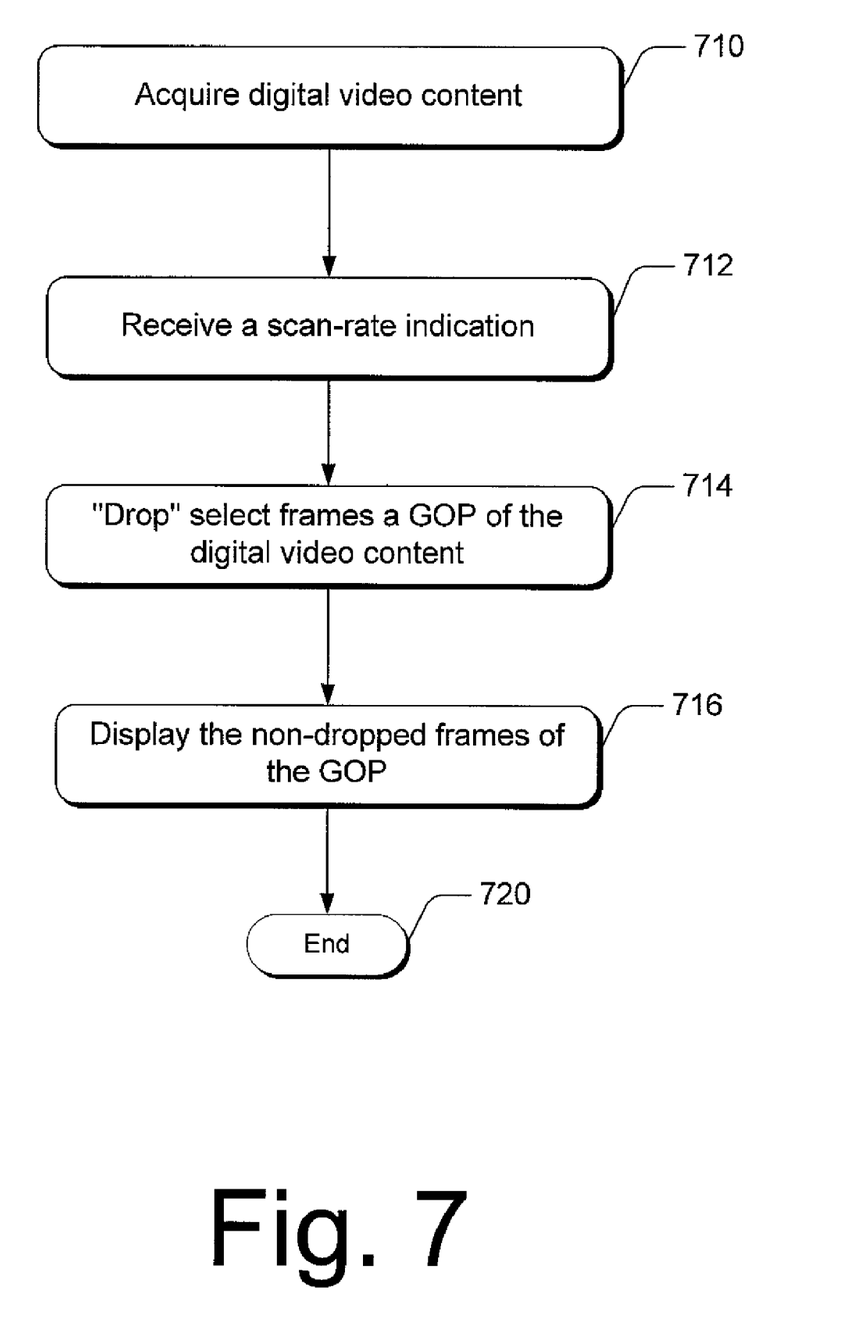
FIG. 7 is a flow diagram showing a methodological implementation described herein.

FIG. 7 shows a methodological implementation of the exemplary presenter. This methodological implementation may be performed in software, hardware, or a combination thereof.

At 710, the exemplary presenter acquires digital video content, such as one or more GOPs of an MPEG formatted digital video. It may be acquired locally or remotely.

At 712, it receives a scan-rate indication. The relative number of frames in the groups with frames selected for display and those for non-display is relative to the indication that specifies the desired scan-rate. As is illustrated in FIGS. 3A-3I, the faster the rate, the more frames are selected for non-presentation.

At 714, based upon the relative degree scan-rate specified by the indication, the exemplary presenter "drops" select frames a GOP.

When "dropping" frames, the exemplary presenter selects specific frames of a GOP for display and it selects frames of the GOP for non-display. If one assumes that the frames are part of one group or the other, then the selection of frames for one group inherently selects frames for the other. Those selected for non-display include frames that are not "parent-way" dependent. Such frames may "child-way" dependent, but they are not parent-way dependent.

As such, B-frames are the first frames selected for non-display (i.e., "dropped"). While a B-frame depends upon other frames (i.e., "child-way" dependent), no other frame depends upon it (i.e., "parent-way" dependent).

As long as there are B-frames, then P-frames (320 and 322) are both child-way and parent-way dependent. The P-frames depend upon an I-frame or another P-frame (i.e., "child-way" dependent). Furthermore, B-frames depend upon them (i.e., "parent-way" dependent).

However, if all of the B-frames have been dropped (as shown in FIG. 3F), then at least one P-frame (e.g., frame 322) has no frame that depends upon it. In this situation, it is no longer parent-way dependent. Therefore, it is next in-line to be dropped (as is shown in FIG. 3G).

At 716, the exemplary presenter displays the non-dropped frames of the GOP. Consequently, it presents a selection of frames of the GOP. Thus, it temporally condenses the presentation of the sequence of frames of the GOP.

The process ends at 720.

Computer-Executable Instructions

An implementation of an exemplary presenter may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer Readable Media

An implementation of an exemplary presenter may be stored on or transmitted across some form of computer readable media. Computer readable media may be any available media that may be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-readable medium encoded with computer-executable instructions that, when executed by a computer, configure the computer to perform operations comprising:
    dropping frames of a Group-of-Pictures (GOP) of a digital video, wherein the dropping includes:
        dropping a first frame that is parent-way dependent such that a second frame is child-way dependent on the first frame;
        dropping the second frame; and
        dropping any other frames that are child-way dependent on the first frame; and
    displaying remaining frames of the GOP.

2. The medium as recited in claim 1, wherein the dropped frames are selected from a group consisting of B-frames and P-frames.

3. The medium as recited in claim 1, wherein the method further comprises obtaining one or more GOPs of a MPEG digital video.

4. The medium as recited in claim 1, the operations further comprising:
    obtaining a variable scan-rate indicator; and
    varying the dropping in response to the indicator.

5. The medium as recited in claim 1, the operations further comprising:
    obtaining a variable scan-rate indicator; and
    determining a ratio of non-presentation frames to presentation frames relative to the variable scan-rate indicator, wherein the dropping of frames is based upon the ratio.

6. A presentation device comprising:
    an audio/visual output; and
    the medium as recited in claim 1.

7. A computer-readable medium encoded with computer-executable instructions that, when executed by a computer, configure the computer to perform operations comprising:
    selecting frames of a Group-of-Pictures (GOP) of a digital video for presentation and frames of the GOP for non-presentation, wherein the selecting frames for non-presentation includes:
        first, selecting frames that are not capable of acting as parent way dependent frames; and
        second, selecting a particular frame that is capable of acting as a parent way dependent frame but for which, during the first selecting, all child frames that depend on the particular frame were selected for non-presentation, such that the particular frame and any frames that depend from the particular frame are each selected for non-presentation; and
    presenting the selected presentation frames of the GOP.

8. The medium as recited in claim 7, wherein the selected presentation frames of the GOP comprise more than one frame.

9. The medium as recited in claim 7, the operations further comprising obtaining one or more GOPs of a MPEG digital video.

10. The medium as recited in claim 7, wherein the presenting comprises sending the selected presentation frames of the GOP over a communications medium.

11. The medium as recited in claim 7, the operations further comprising:
    obtaining a variable scan-rate indicator; and
    varying the selecting in response to such the indicator.

12. The medium as recited in claim 7, the operations further comprising:
    obtaining a variable scan-rate indicator; and
    determining a ratio of non-presentation frames to presentation frames relative to the variable scan-rate indicator, wherein the selecting of frames is based upon the ratio.

13. A presentation device comprising:
    an audio/visual output; and
    the medium as recited in claim 7.

14. A method comprising:
    selecting, by a video presentation device, frames of a Group-of-Pictures (GOP) of a digital video for presentation and frames of the GOP for non-presentation, wherein the selected non-presentation frames comprise a frame that is parent-way dependent, and wherein for each child-way dependent frame selected for presentation, also selecting for presentation each parent-way dependent frame from which the child-way dependent frames selected for presentation depend; and
    presenting, by the video presentation device, the selected presentation frames of the GOP.

15. The method as recited in claim 14 further comprising obtaining one or more GOPs of a digital video.

16. The method as recited in claim 14 further comprising:
    obtaining a variable scan-rate indicator; and
    varying the selecting in response to the indicator.

17. The method as recited in claim 14, further comprising:
    obtaining a variable scan-rate indicator; and
    determining a ratio of non-presentation frames to presentation frames relative to the variable scan-rate indicator, wherein the selecting frames is based upon such the ratio.

18. A presentation device configured to perform the method as recited in claim 14.

* * * * *